US007085235B2

(12) United States Patent
Pin et al.

(10) Patent No.: US 7,085,235 B2
(45) Date of Patent: Aug. 1, 2006

(54) METHOD AND APPARATUS FOR CONSTRUCTING AND SEARCHING IP ADDRESS

(75) Inventors: Shou-Yu Pin, Kaohsiung (TW); Lih-Chyan Wuu, Yunlin (TW)

(73) Assignee: Accton Technology Corporation, Hsinchu (TW)

( * ) Notice: Subject to any disclaimer, the term of this patent is extended or adjusted under 35 U.S.C. 154(b) by 919 days.

(21) Appl. No.: 10/127,323

(22) Filed: Apr. 22, 2002

(65) Prior Publication Data

US 2003/0198234 A1   Oct. 23, 2003

(51) Int. Cl.
  *H04L 12/22*   (2006.01)
  *H04L 12/36*   (2006.01)
(52) U.S. Cl. .................. 370/235; 370/389; 370/392; 370/400
(58) Field of Classification Search ............ 370/389, 370/392, 400
  See application file for complete search history.

(56) References Cited

U.S. PATENT DOCUMENTS

2003/0081554 A1* 5/2003 Huang et al. ............... 370/238

FOREIGN PATENT DOCUMENTS

TW    410292    1/1988

OTHER PUBLICATIONS

Huang, N-F, et al. "A Novel IP-Routing Lookup Scheme and Hardware Architecture for Multigigabit Switching Routers" *IEEE J. on Selected Areas in Communications*, vol. 17, No. 6, (1999).
Degermark, M., et al. "Small Forwarding Tables for Fast Routing Lookups" Proc. ACM SIGCOMM '97, p. 3-14, (1997).
Gupta, P., et al. "Routing Lookups in Hardware at memory Access Speeds" Proc. IEEE INFROCOM '98, p. 1240-1247, (1998).

* cited by examiner

*Primary Examiner*—Chi Pham
*Assistant Examiner*—Ronald Abelson
(74) *Attorney, Agent, or Firm*—Thomas, Kayden, Horstemeyer & Risley

(57) ABSTRACT

The present invention discloses an IP address construction and lookup method and apparatus used in routers, which uses a compress technology to reduce memory size occupied by a segment array and a plurality of next hop arrays used in an indirect lookup table method, and also reduce the number of memory accesses from 1 to 4 times. Besides, only one memory access is required if a pipeline scheme is in use. In addition, when the routing table is updating, it is unnecessary to rebuild the forwarding table and capable of finishing newer actions.

8 Claims, 12 Drawing Sheets

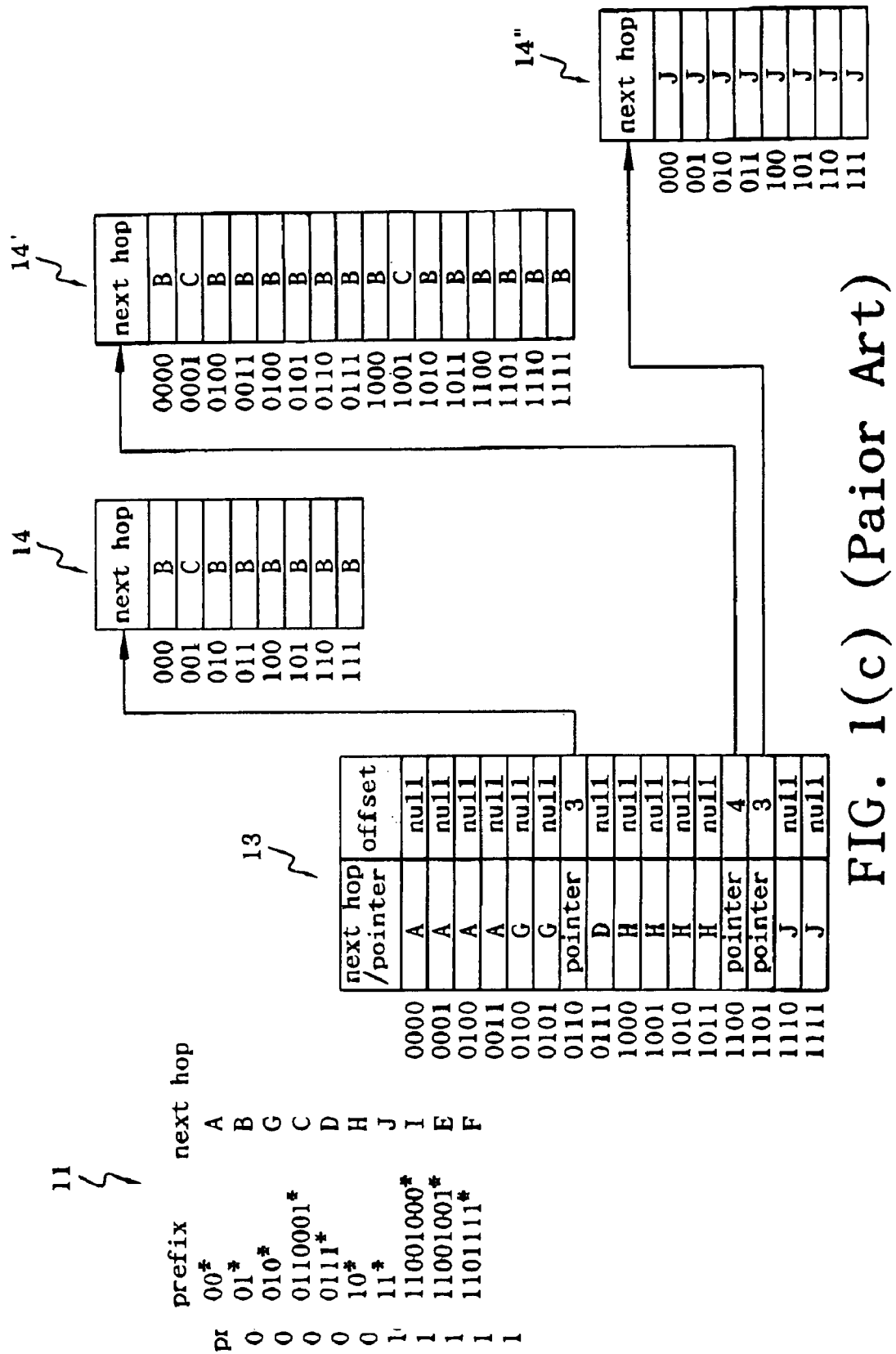
FIG. 1(c) (Paior Art)

METHOD AND APPARATUS FOR CONSTRUCTING AND SEARCHING IP ADDRESS

BACKGROUND OF THE INVENTION

1. Field of the Invention

The invention relates to an Internet Protocol (IP) address lookup method used in routers, particularly to a lookup method to obtain IP address with multi-level forwarding table.

2. Description of Related Art

Because of the fast development of Internet and the network traffic flow tending to be unpredictable, the original 80/20 rule (80% traffic flow in local area network and 20% traffic flow in wide area network) is no longer applied, adding that the emerging Gigabit Ethernet make router become the bottleneck of the network performance. By and large, there's a Routing Table inside the router, which includes the connectivity data among networks for router to perform the routing information processing in accordance with the table during packet switching. However, as router needs to consume lots of resources during Routing Information Processing, it is one of the major reasons to slow down the speed of router. To increase the Layer 3 (Network Layer) packet switching processing performance, as a result, the routing search capability must be effectively elevated.

For each entered packet, router must count on the destination address in the routing table to execute IP address search once to decide to where the next hop shall be sent. Each item in the routing table includes destination address/ network mask and output port number. In view of the introduction of CIDR technology, items in routing table is defined as prefix/prefix length and output port number and the prefix length is limited in between 0 and 32.

IP address search mechanism is to conduct the search of the longest prefix matching in the routing table of router in terms of the destination address of each entered packet so that the corresponding next hop can be located. As the process is sort of complicated, most of routers today all employ software to operate. Whereas the conversion speed can't satisfy the huge flow in the current network, this also makes the IP address search become the major bottleneck of current network.

The conventional method for improving the lookup capability of router is the indirect lookup. The method first assumes a corresponding binary trees 12 in accordance with the prefix in the routing table and defines the IP address occupied by each prefix. Then construct a segment array and a plurality of next hop array and IP address lookup algorithm is that utilizes the index of the segment array to find out the corresponding next hop of the packet.

An embodiment using the indirect lookup method is shown in FIGS. 1(a) to 1(c). FIG. 1(a) shows that ten prefixes (number A to J) in the routing table are visualized to the corresponding binary tries structure. FIG. 1(b) defines the IP addresses taken by each prefix (number A to J). FIG. 1(c) separates the prefix into two nibbles. The most significant nibble is used for the address of segment array 13 and the less significant nibble is used for the addresses of a plurality of next hop arrays 14, 14' and 14". The contents of the segment array 13 and the plurality of next hop arrays 14~14" are filled in accordance with the IP address occupied by the prefix of Number A to J. For example, the first column of the segment array 13 records next hop (when the bit number of the prefix is less than 4) or points to the pointers of next hop arrays 14~14", the second column is the longest offset k (bit number of the prefix minus 4) of the corresponding prefix of the pointer, and the corresponding next hop arrays 14~14" of the pointer has $2^k$ contents. The next hop arrays 14~14" has only one column for recording the next hop. After constructing the contents of the segment array 13 and plurality of next hop arrays 14~14", IP address lookup algorithm can use IP address of packet along with the instruction of the segment array 13 and next hop array 14~14" to find out the corresponding next hop of the packet.

However, the segment array 13 and plurality of next hop arrays 14~14" of the said indirect lookup method is not flexible in operation and require lots of memories.

Another method for improving the lookup capability of router is declared in the patent description of the Patent Publication No. 410292 of Republic of China, entitled "Method and system for routing information construction and IP routing lookup applied in ultra high speed switching router". Such method ensures that the lookup times of output port during packet switching won't exceed 3 times with compression means and confines the size of the forwarding table to be lower than 512 KB. Whereas, the said compression method is very complicated and the corresponding forwarding table must be rebuilt to obtain the most complete routing table when the connection of router changes, causing operation extremely inconvenient.

In summary, to satisfy more and more users using network capable of swiftly operating, how to build up the router with high transmission efficiency is actually a very important subject for the time being.

SUMMARY OF THE INVENTION

The objective of the invention targets at providing a method and apparatus for IP address construction and lookup.

To achieve the said objective, the IP address construction and lookup according to the present invention is to effectively reduce the segment array size in the indirect lookup table, i.e. calculating a 16-bit compression bit map (CBM) or next hop by scanning from left to right based on the unit of $2^4$ segment array entries and then places the obtained result in the next hop column of the first-level forwarding table. As such, the entire segment array can be divided as $2^{12}$ pieces of the first groups and recorded in the first-level forwarding table. When the values of all the 16 bits are identical, the next hop/map column in the first-level forwarding table is recorded a next hop; otherwise, the next hop/map column of the first-level forwarding table records a CBM bits and the pointer column is recorded the address of the second-level forwarding table. If the value of the map code for compression bits is 1, it means that the values of the corresponding neighboring bit values of the segment array are not equal. Consequently, by means of the accumulated count of the bit value of CBM as logic one, the corresponding entry count in the second-level forwarding table can be acquired accordingly. If the bit number of the prefix is less than 16, the next hop/pointer column in the second-level forwarding table is recorded in accordance with the sequence of next hop in the segment array. Otherwise, the next hop/pointer column in the second-level forwarding table is recorded a pointer and a longest offset in the longest offset column. If the bit length of the longest offset is greater than 4, the third-level forwarding table and the fourth-level forwarding table are required, or the third-level forwarding table only is required. Furthermore, sequentially calculate a 16-bit CBM bits or next hop in terms of the said method and place the obtained result in the next hop column of the third-level forwarding table. As the invention uses $2^4$ entries of the next hop array to proceed scanning, the overall next hop array is divided as $2^{length-4}$ second groups (length represents half of the value that the bit number of the longest offset of prefix minus the IP bit number), which are recorded in the third-level forwarding table. When the values of all the bits in the second group are identical, the next hop/map column of the third-level forwarding table is recorded a next hop, otherwise the next hop/map column of the third-level forwarding table is recorded a CBM bits and pointer column is recorded the address of the fourth-level forwarding table. If the map value of the compression bits is 1, it means that the corresponding neighboring bit values of the next hop array are not identical. Consequently, by means of the accumulated count of the bit value of CBM as logic one, the corresponding entry count in the fourth-level forwarding table can be acquired accordingly. The fourth-level forwarding table only includes a next hop column.

The IP address construction and lookup method and apparatus of router according to the present invention first compress the routing table occupying more memories into smaller forwarding table and then proceed IP address lookup. The invention has the following advantages;

1. If the memory access frequency is in between one and four and the pipeline scheme is in use, only one memory access is required.
2. When routing table is updating, it is unnecessary to rebuild the forwarding table and capable of finishing newer actions.
3. SRAM can be used.
4. Require little memory space.

BRIEF DESCRIPTION OF THE DRAWINGS

The present invention will be described according to the appended drawings in which:

FIGS. 1(a)~(c) show an IP address construction, lookup method and its apparatus of prior routers;

DETAILED DESCRIPTION OF THE INVENTION

Figure 1A:
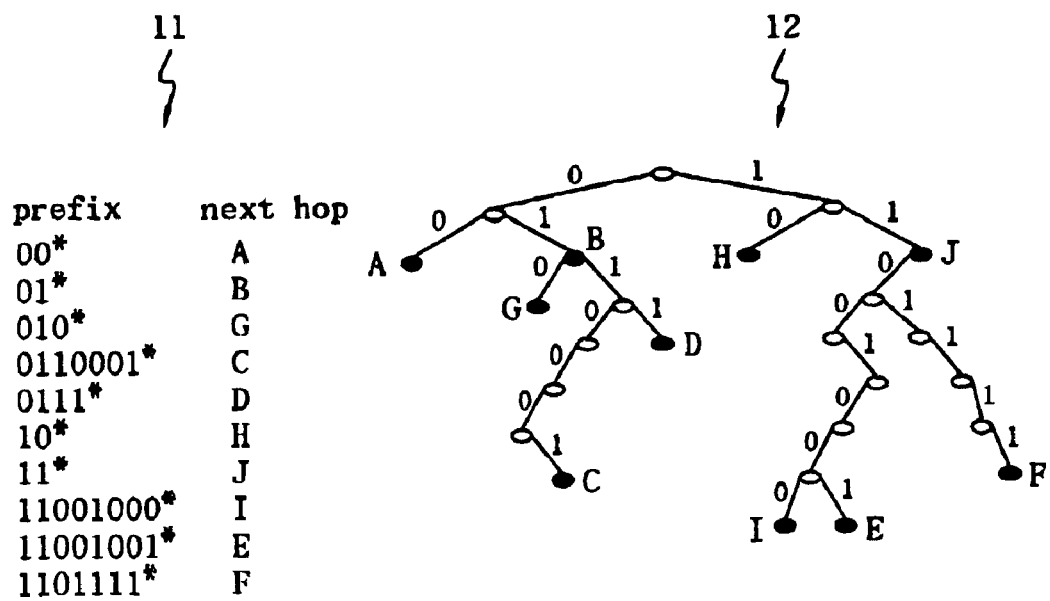
Figure 1B:
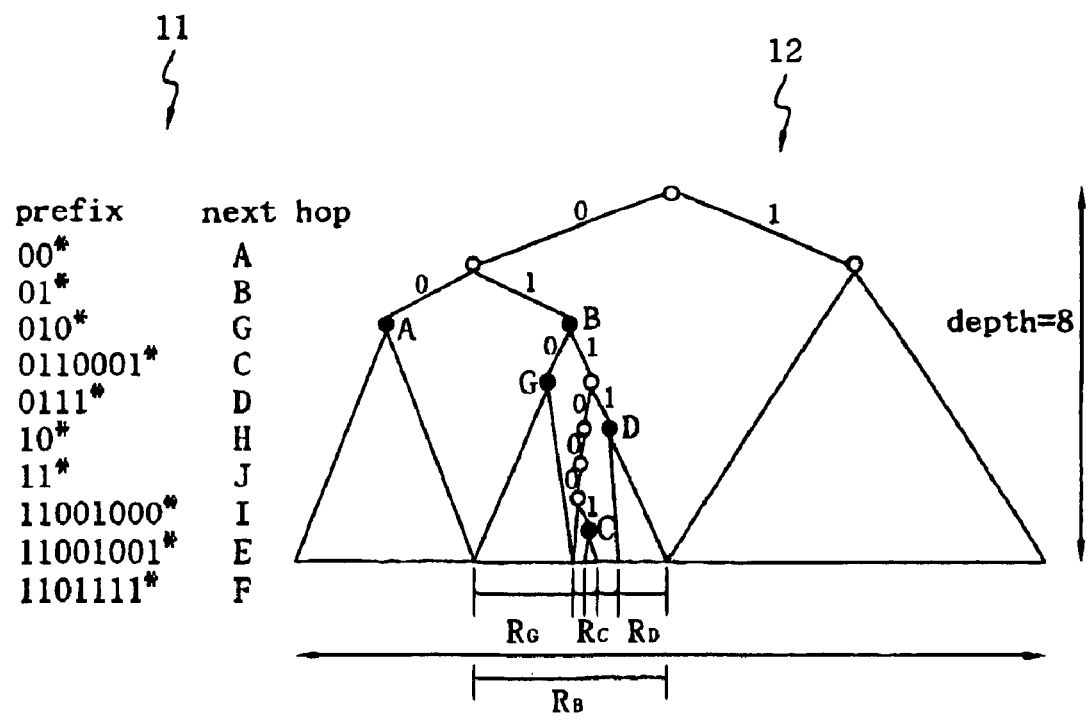
Figure 2:
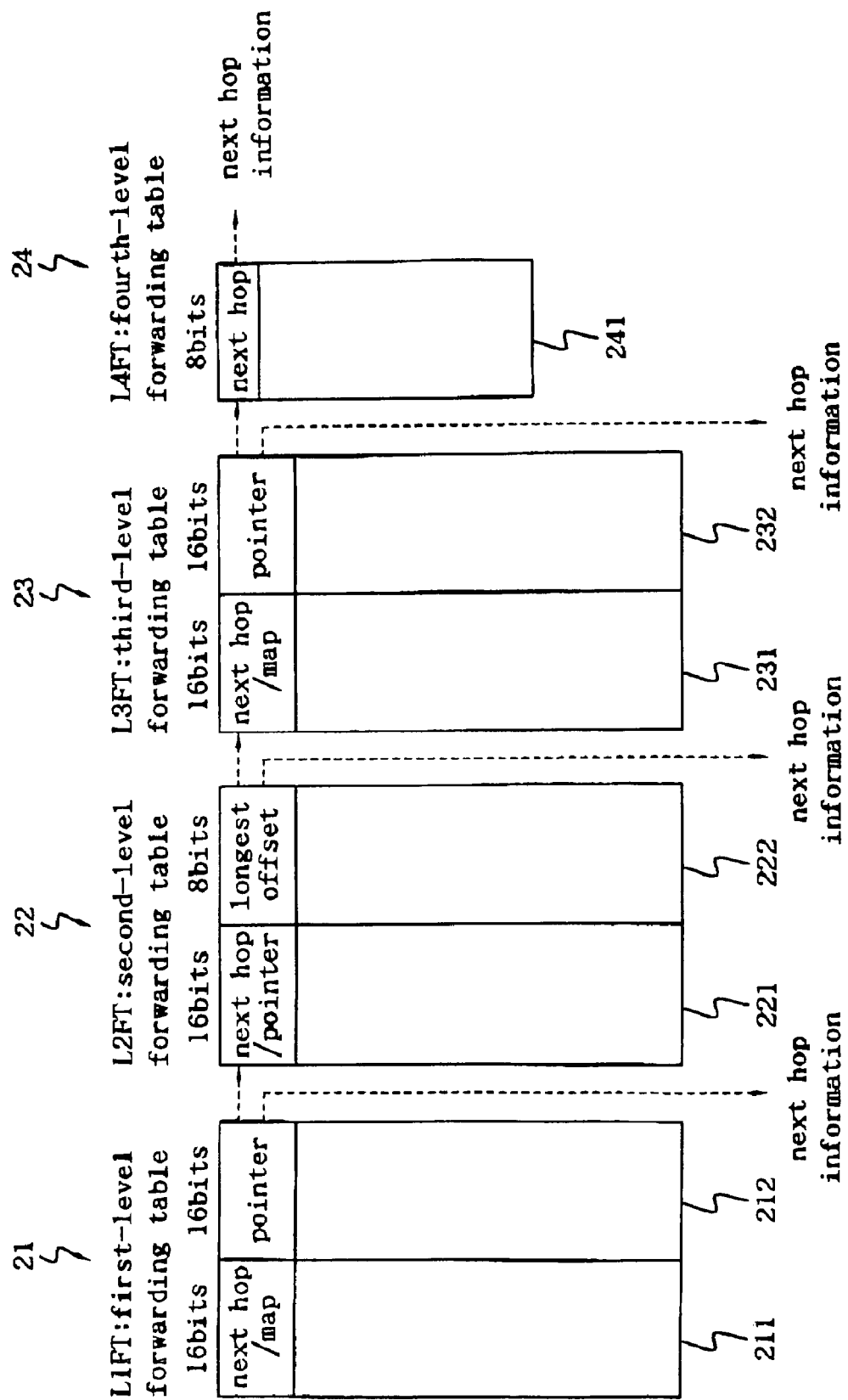
FIG. 2 shows one embodiment of an IP address construction, lookup method and its apparatus of the routers according to the present invention.

FIG. 2 shows an IP address construction, lookup method and its apparatus of the routers according to the present invention. To effectively reducing the requirement of memory and accelerating the lookup speed, the implementation example utilizes four sets of forwarding tables, namely the first-level forwarding table 21, the second-level forwarding table 22, the third-level forwarding table 23 and the fourth-level forwarding table 24, in which the first-level forwarding table 21 and the second-level forwarding table 22 correspond to the conventional segment array 13 in the indirect lookup table method, and the third-level forwarding table 23 and the fourth-level forwarding table 24 correspond to the conventional next hop array 14 of the indirect lookup table method. The first-level forwarding table 21 contains a next hop/map column 211 and pointer column 212. If the next hop/map column 211 is embedded with a next hop, the pointer column 212 is null; and if the next hop/map column 211 is embedded with a CBM and the pointer column 212 points to the address of the second-level forwarding table 22. The second-level forwarding table 22 contains a next hop/pointer column 221 and the longest offset column 222. If the next hop/pointer column 221 is embedded with a next hop, the longest offset column 222 is null; and if the next hop/pointer column 221 is embedded with a pointer, the longest offset column 222 is embedded with the bit number with a longest offset. The third-level forwarding table 23 contains a next hop/map column 231 and pointer column 232. If the next hop/map column 231 contains a next hop, the pointer column 232 is null; and if the next hop/map column 231 contains a CBM, the pointer column 232 points to the address of the fourth-level forwarding table 24. The fourth-level forwarding table 24 contains only one next hop column 241.

To effectively reduce the size of segment array 13 in the indirect lookup table method, the invention calculates a 16-bit CBM or next hop by scanning from left to right based on the unit of $2^4$ segment array entries and then places the obtained result in the next hop column 211 of the first-level forwarding table 21. In general, CBM is set the most left bit as logic one and the rest of bits depending upon the neighboring bits of the segment 110 array. If the values of the neighboring bits in the corresponding segment array are not identical, the corresponding CBM is logic one or logic 0 otherwise. As the invention uses $2^4$ segment array entries as unit to conduct one scanning, the entire segment array is divided as $2^{12}$ first groups, which are recorded in the first-level forwarding table 21. When the values of all 16 bits in the first group is identical, the next hop/map column 211 of the first-level forwarding table 21 is recorded a next hop. Otherwise the next hop/map column 211 of the first-level forwarding table 21 is recorded a CBM and the pointer column 212 is recorded the address of the second-level forwarding table 22. If the CBM value is one, it means that the values of the corresponding neighboring bits are not identical. Consequently, by means of the accumulated count of the bit value of CBM as logic one, the corresponding entry count in the second-level forwarding table 22 can be acquired accordingly. If the bit number of the prefix is less than 16, the next hop/pointer column in the second-level forwarding table is recorded in accordance with the sequence of next hop in the segment array. Otherwise, the next hop/pointer column 221 in the second-level forwarding table is recorded a pointer and a longest offset in the longest offset column 222.

Figure 3:
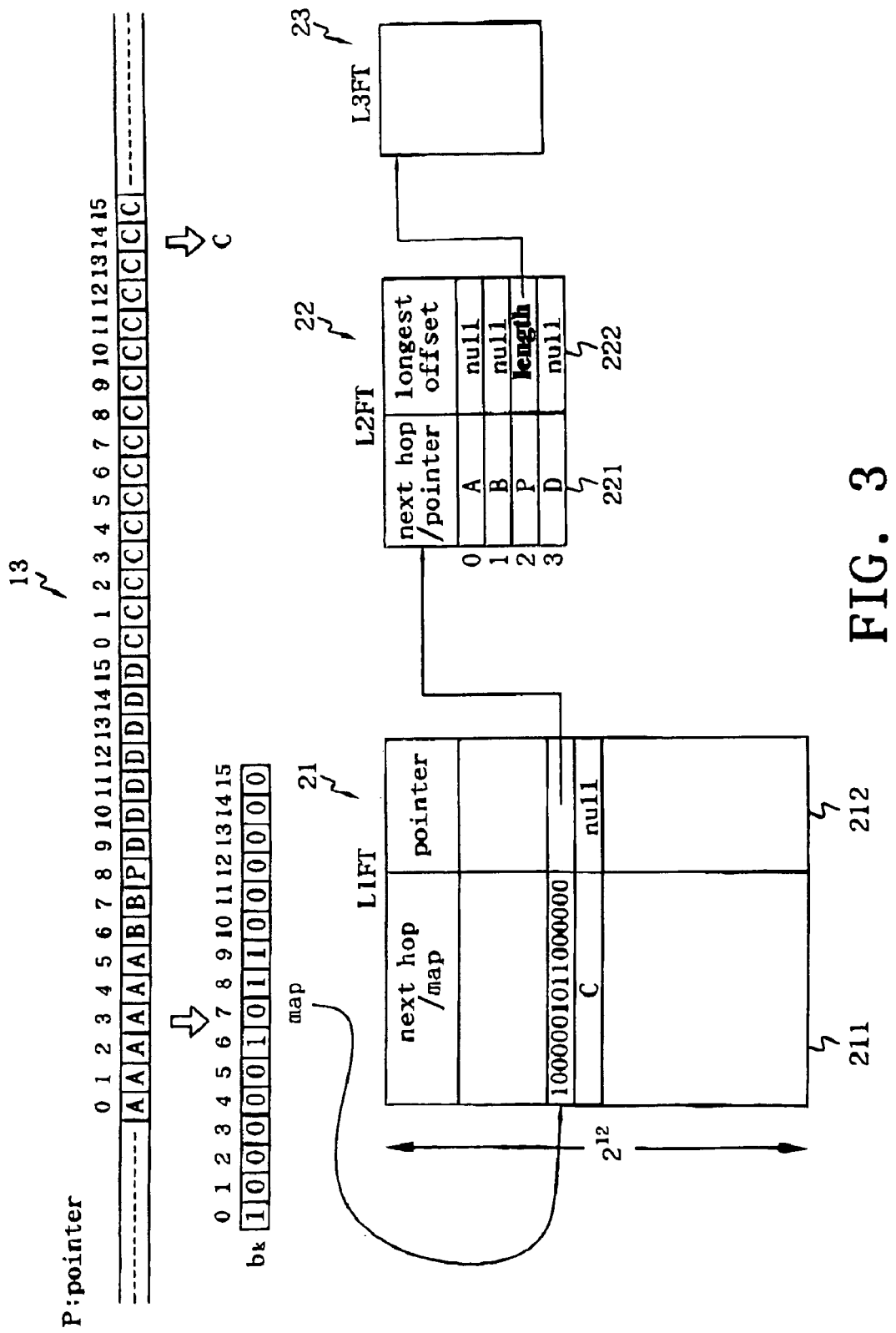
FIG. 3 shows one embodiment of constructing a first-level forwarding table and a second-level forwarding table according to the present invention.

FIG. 3 shows one embodiment of constructing a first-level forwarding table 21 and a second-level forwarding table 22 according to the present invention. As the nibble values $SA_k$[i] in the entries of the former section (AAAAAABBPD-DDDDD) of the segment array 13 are not completely the same, a CBM is calculated as 1000001011000000. Furthermore, as the CBM provides 4 bit values with bits of logic 1, the corresponding second-level forwarding table 22 provides 4 entries. As the nibble values $SA_k$ [i] in the entries of the latter section (CCCCCCCCCCCCCCCC) of the segment array 13 are completely the same, the next hop/map column 211 of the first-level forwarding table 21 is directly stored C as next hop. The following calculation method can be used to generate the entry values of the first-level forwarding table 21 and the second-level forwarding table 22.

The Algorithm of the First-level and Second-level Forwarding Tables

---
(L1FT/L2FT)
---

Input: Segment_array[j]
Output: L1FT/L2FT
/* $SA_k$[i] represents i-th content of the k-th subgroup of the segment array,
   $CBM_k$[i] represents CBM having 16 bits,
   L1FT[k] represents k-th content of the first-level forwarding table,
   $L2FT_k$[j] represents the content of the j-th bit of the k-th second-level forwarding table */
For k = 0 to $2^{12}$ − 1 do
{ $CBM_k$[0] = 1, flag = 0, j = 0
    If $SA_k$[0] = pointer then
    { constructing a corresponding third-level forwarding table
      $L2FT_k$[0] ← (address of the third-level forwarding table, bit length of the longest offset)
      j = 1
      Flag = 1
    }
    For i = 1 to 15 do
    {
       If $SA_k$[i] = $SA_k$[i−1] then $CBM_k$[i] = 0
       Else
       { $CBM_k$[i] = 1
         flag = 1
         If $SA_k$[i] = pointer then
         { constructing a corresponding third-level forwarding table
             $L2FT_k$[j] = (address of the third-level forwarding table, bit length of the longest offset)
         }
         Else $L2FT_k$[j] ← ($SA_k$[i], null)
         j = j + 1
       }
    }
If flag = 0 then L1FT[k] ← ($SA_k$[0], null)
Else L1FT[k] ← ( $CBM_k$, address of the k-th second-level forwarding table)
}

---

If the bit length of the longest offset is greater than 4, it is necessary to use the third-level forwarding table 23 and the fourth-level forwarding table 24 for operation. Otherwise, it is necessary it is necessary to use the third-level forwarding table 23 only. To effectively reduce the size of the next hop array in the indirect lookup table, the invention calculates a 16-bit CBM or next hop by scanning from left to right based on the unit of $2^4$ segment array entries and then places the obtained result in the next hop column 231 of the third-level forwarding table 23. As the invention uses $2^4$ entries of the next hop array to proceed scanning, the overall next hop array is divided as $2^{length−4}$ second groups (length represents half of the value that the bit number of the longest offset of prefix minus the IP bit number), which are recorded in the third-level forwarding table 23. When the values of all the bits in the second group are identical, the next hop/map column 231 of the third-level forwarding table 23 is recorded a next hop, otherwise the next hop/map column 231 of the third-level forwarding table 23 is recorded a CBM bits and pointer column 232 is recorded the address of the fourth-level forwarding table 24. If the map value of the compression bits is 1, it means that the corresponding neighboring bit values of the next hop array are not identical. Consequently, by means of the accumulated count of the bit value of CBM as logic one, the corresponding entry count in the fourth-level forwarding table 24 can be acquired accordingly. The fourth-level forwarding table 24 only includes a next hop column 241.

Figure 4:
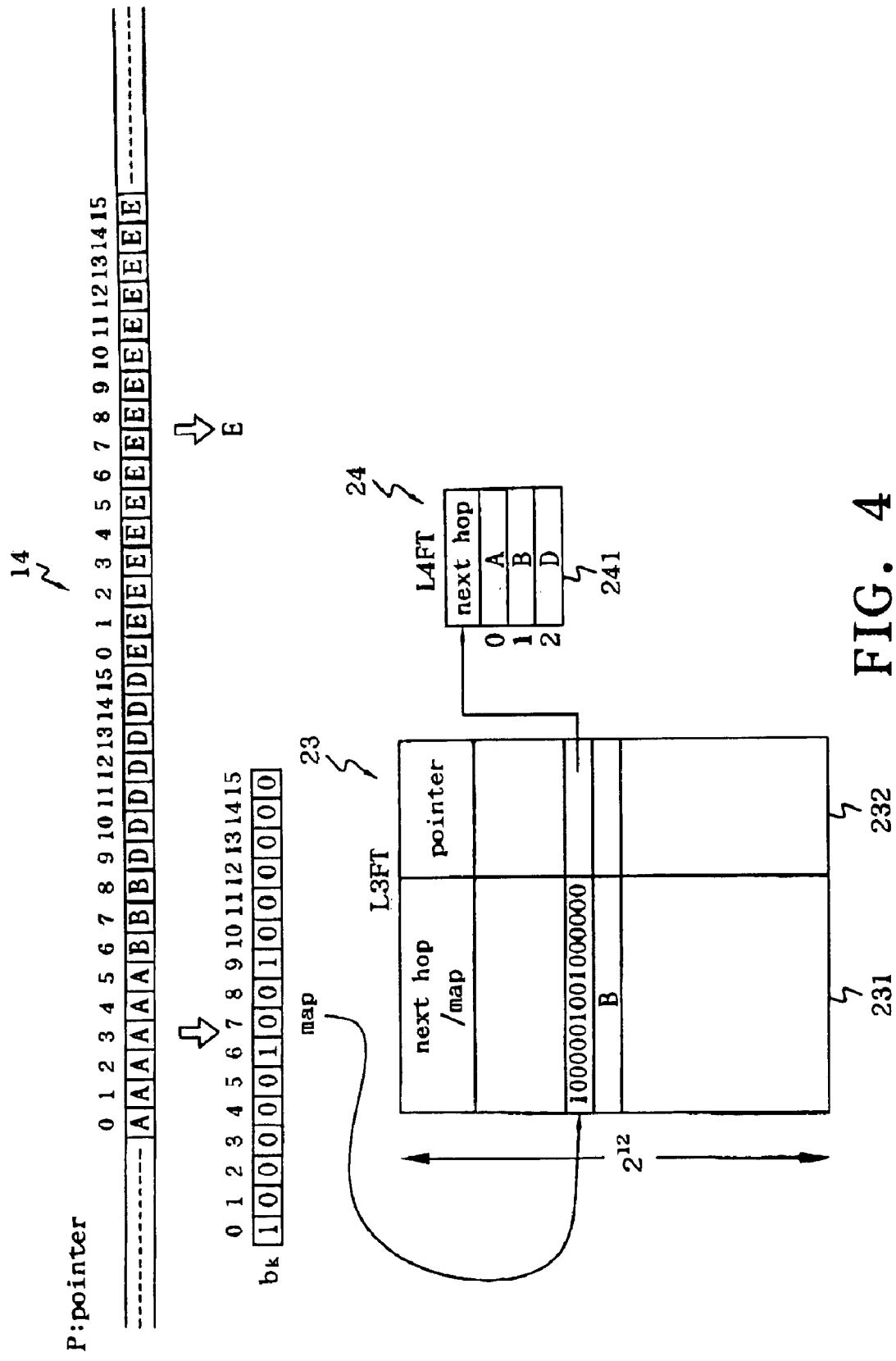
FIG. 4 shows one embodiment of constructing a third-level forwarding table and a fourth-level forwarding table according to the present invention.

FIG. 4 shows one embodiment of constructing a third-level forwarding table 23 and a fourth-level forwarding table 24 according to the present invention. As the nibble values $HNA_k$ [i] in the entries of the former section (AAAAAABBBDDDDDDD) of the next hop array are not completely the same, a CBM is calculated as 1000001001000000. Furthermore, as the CBM provides 3 bit values with bits of logic 1, the corresponding fourth-level forwarding table 24 provides 3 entries. As the nibble values $HNA_k$ [i] in the entries of the latter section (EEEEEEEEEEEEEEEE) of the next hop array are completely the same, the next hop/map column 231 of the third-level forwarding table 23 is directly stored E as next hop. The following calculation method can be used to generate the entry values of the third-level forwarding table 23 and the fourth-level forwarding table 24.

The Algorithm of the Third-level and Fourth-level Forwarding Tables

---
(L3FT/L4FT)
---

Input: Next_hop_array[j]
Output: third-level and fourth-level forwarding tables
/* $NHA_k$[i] represents the i-th content of the k-th Next_hop_array,
   $CBM_k$[i] represents CBM having 16 bits,
   L3FT[k] represents k-th content of the third-level forwarding table,
   $L4FT_k$[j] represents the content of the j-th bit of the k-th fourth-level forwarding table */
If the longest offset < 4 then L3FT = NHA
Else
{ For k = 0 to $2^{length−4}$ − 1 do
    {
       $CBM_k$[0] = 1, flag = 0, j = 0
       For i = 1 to 15 do
       {
          If $NHA_k$[i] =$NHA_k$[i−1] then $CBM_k$[i] = 0
          Else
          { $CBM_k$[i] = 1
              $L4FT_k$[j] = $NHA_k$[i]
              j = j + 1, flag = 1
          }
       }
    If flag = 0 then L3FT[k] ← ($NHA_k$[i], null)
    Else L3FT[k] ← ( $CBM_k$, address of $L4FT_k$)
    }
}

---

Figure 5:
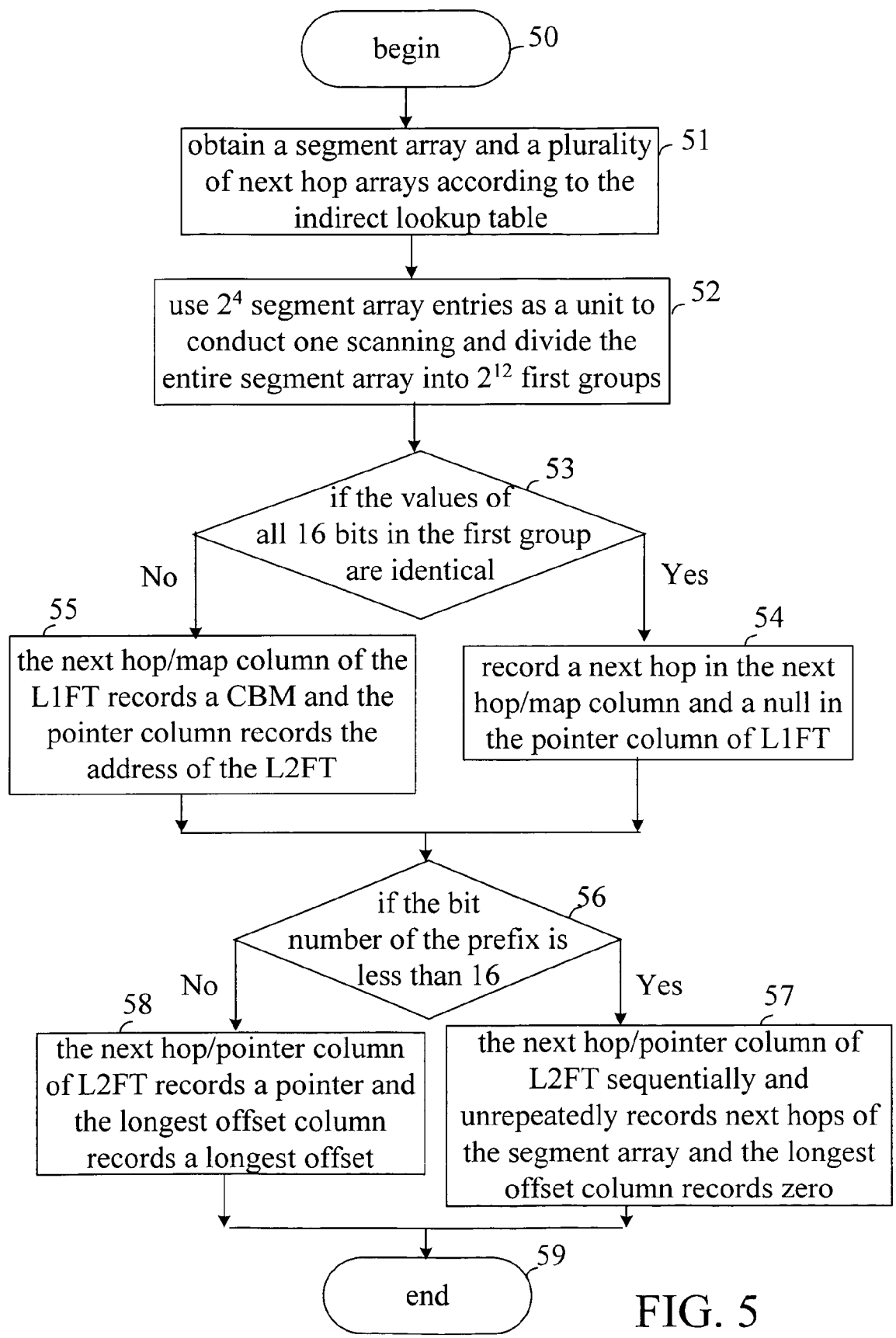
FIG. 5 shows a flow chart of constructing the first-level forwarding table and the second-level forwarding table according to the present invention.

FIG. 5 shows a flow chart of constructing the first-level forwarding table 21 and the second-level forwarding table 22 according to the present invention. At step 51, the invention starts. At step 51, obtain segment array and plurality of next hop arrays according to the indirect lookup table method. At step 52, use $2^4$ segment array entries as unit to conduct one scanning and divide the entire segment array into $2^{12}$ first groups. At step 53, determine if the values of all 16 bits in the first group are identical. If the answer is positive, enter step 54, otherwise, enter step 55. At step 54, record a next hop in the next hop/map column of the first-level forwarding table and a null in the pointer column. At step 55, the next hop/map column of the first-level forwarding table records a CBM and the pointer column records the address of the second-level forwarding table. At step 56, determine if the bit number of the prefix is less than 16. If the answer is positive, enter the step 57. Otherwise, enter the step 58. At step 57, the next hop/pointer column of the second-level forwarding table sequentially and unrepeatedly is recorded in the next hop of the segment array and the longest offset column is recorded a 0. At step 58, the next hop/pointer column of the second-level forwarding table is recorded a pointer and the longest offset column is recorded a longest offset. At step 59, the invention is done.

Figure 6:
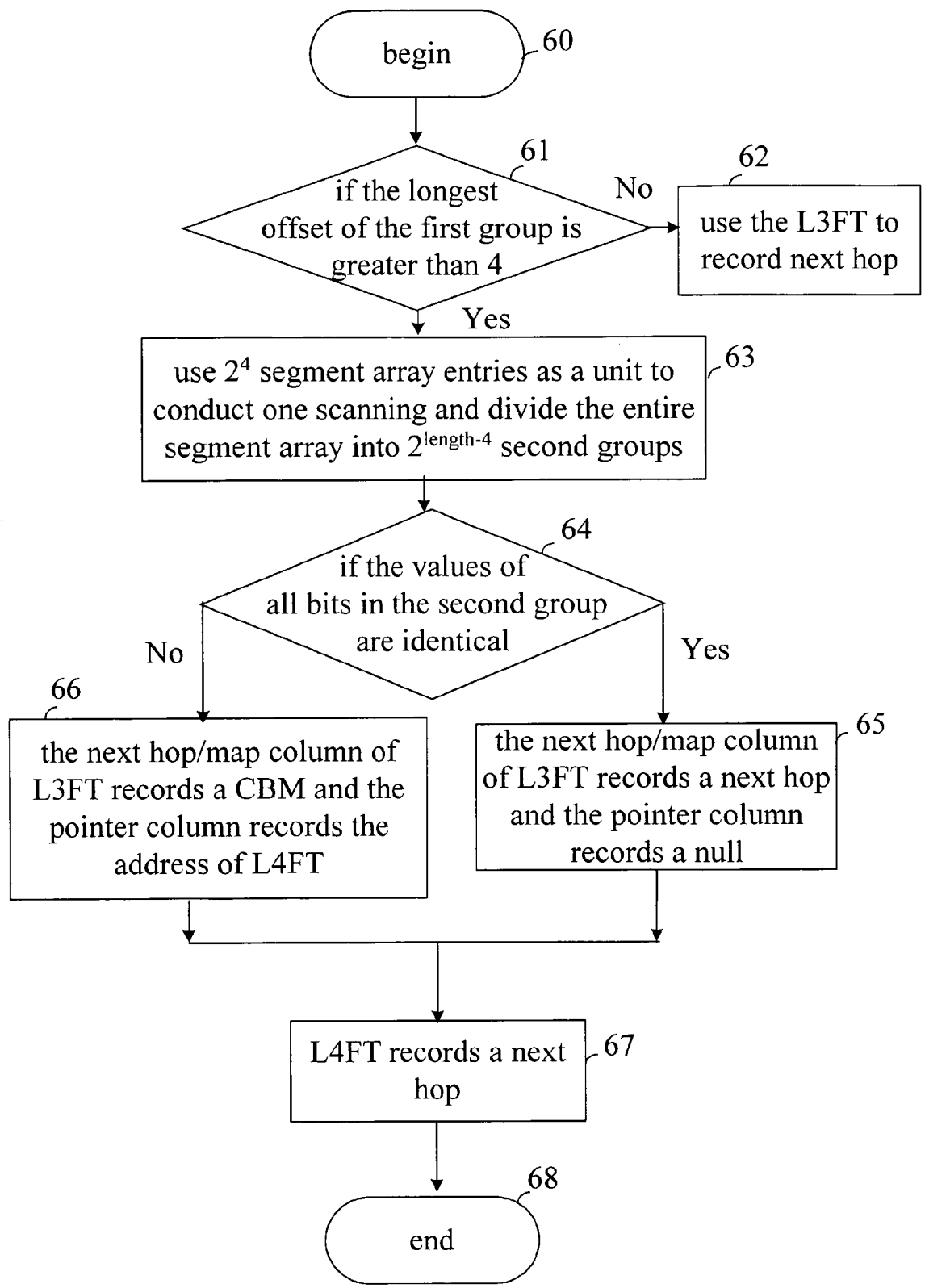
FIG. 6 shows a flow chart of constructing the third-level forwarding table and the fourth-level forwarding table according to the present invention.

FIG. 6 shows a flow chart of constructing the third-level forwarding table 23 and the fourth-level forwarding table 24 according to the present invention. At step 60, the invention starts. At step 61, determine if the longest offset of the first group is greater than 4. If the answer is positive, enter step 63, otherwise, enter step 62. At step 62, use the third-level forwarding table to record next hop. At step 63, use 24 segment array entries as unit to conduct one scanning and divide the entire segment array into $2^{length-4}$ second groups. At step 64, determine if the values of all bits in the second group are identical. If positive, enter step 65, otherwise enter step 66. At step 65, the next hop/map column of the third-level forwarding table is recorded a next hop and the pointer column is recorded a null. At step 66, the next hop/map column of the third-level forwarding table is recorded a CBM and the pointer column is recorded the address of the fourth-level forwarding table. At step 67, the fourth-level table is recorded a next hop. At step 58, the invention is done.

Figure 7:
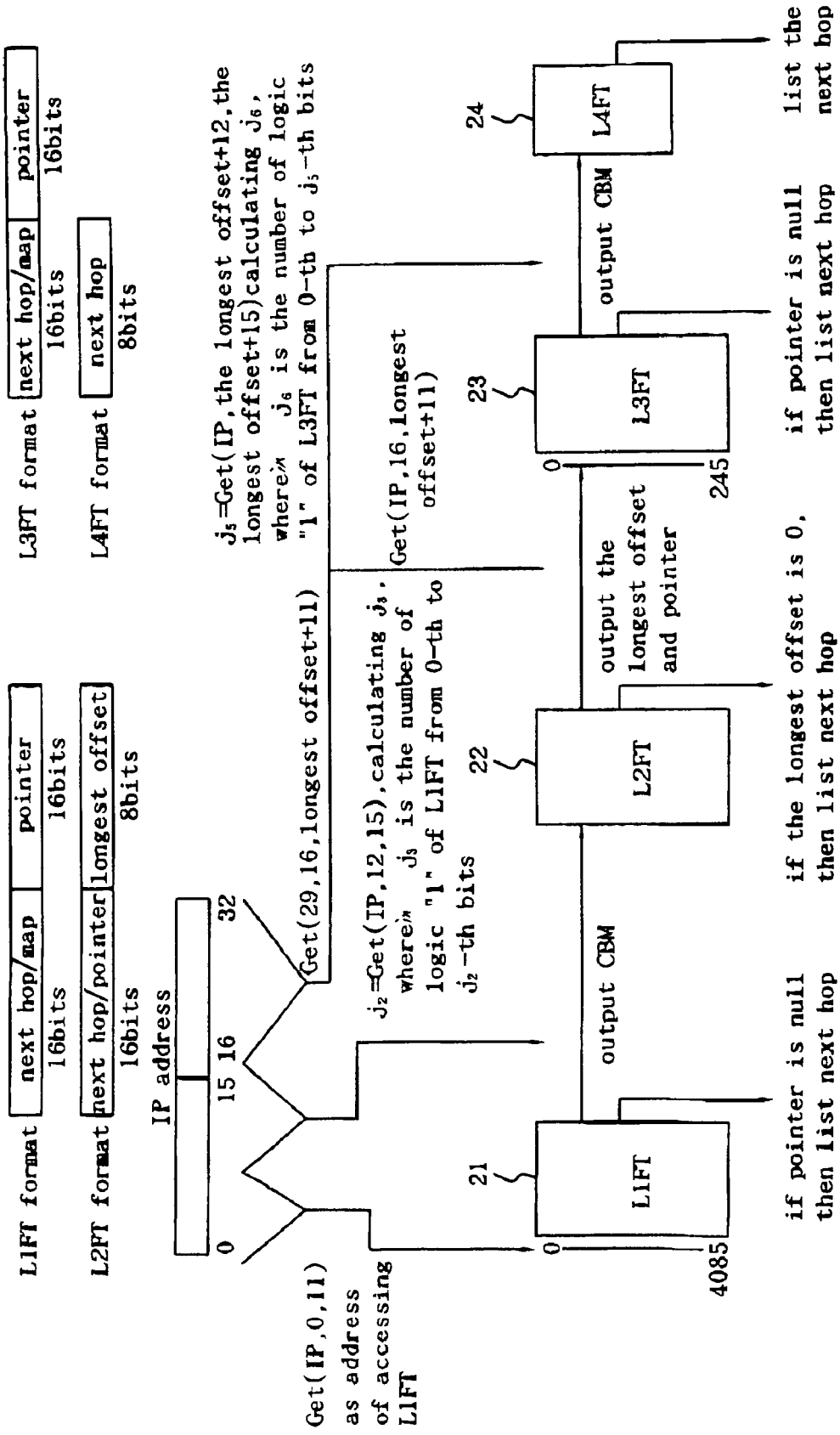
FIG. 7 shows a schematic diagram of combining FIG. 5 and FIG. 6.

FIG. 7 shows a schematic diagram of combining FIG. 5 and FIG. 6, from which the first-level to the fourth-level forwarding tables 21~24 are obtained.

Figure 8A:
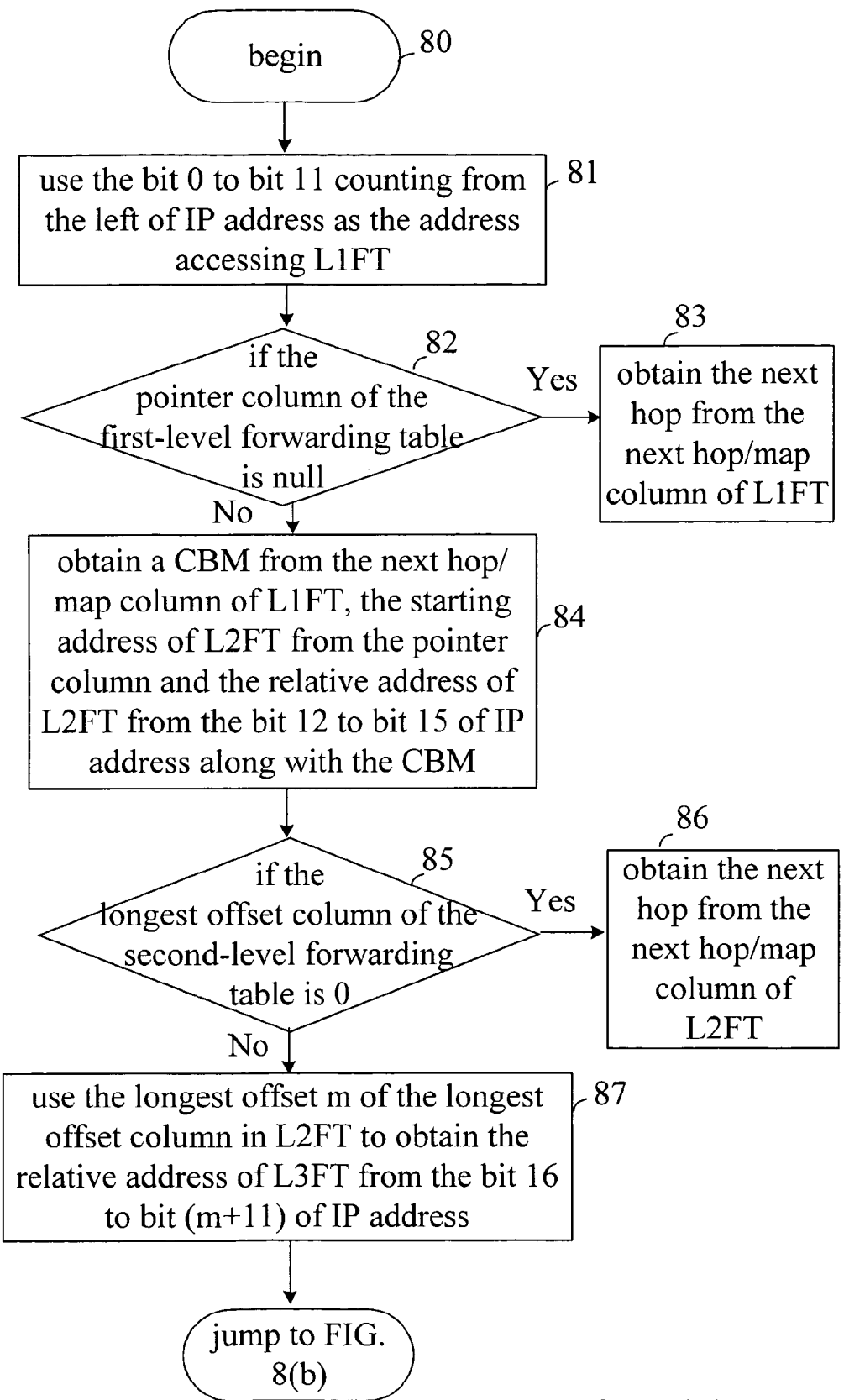
FIG. 8 shows a flow chart of the IP address lookup method according to the present invention.
Figure 8B:
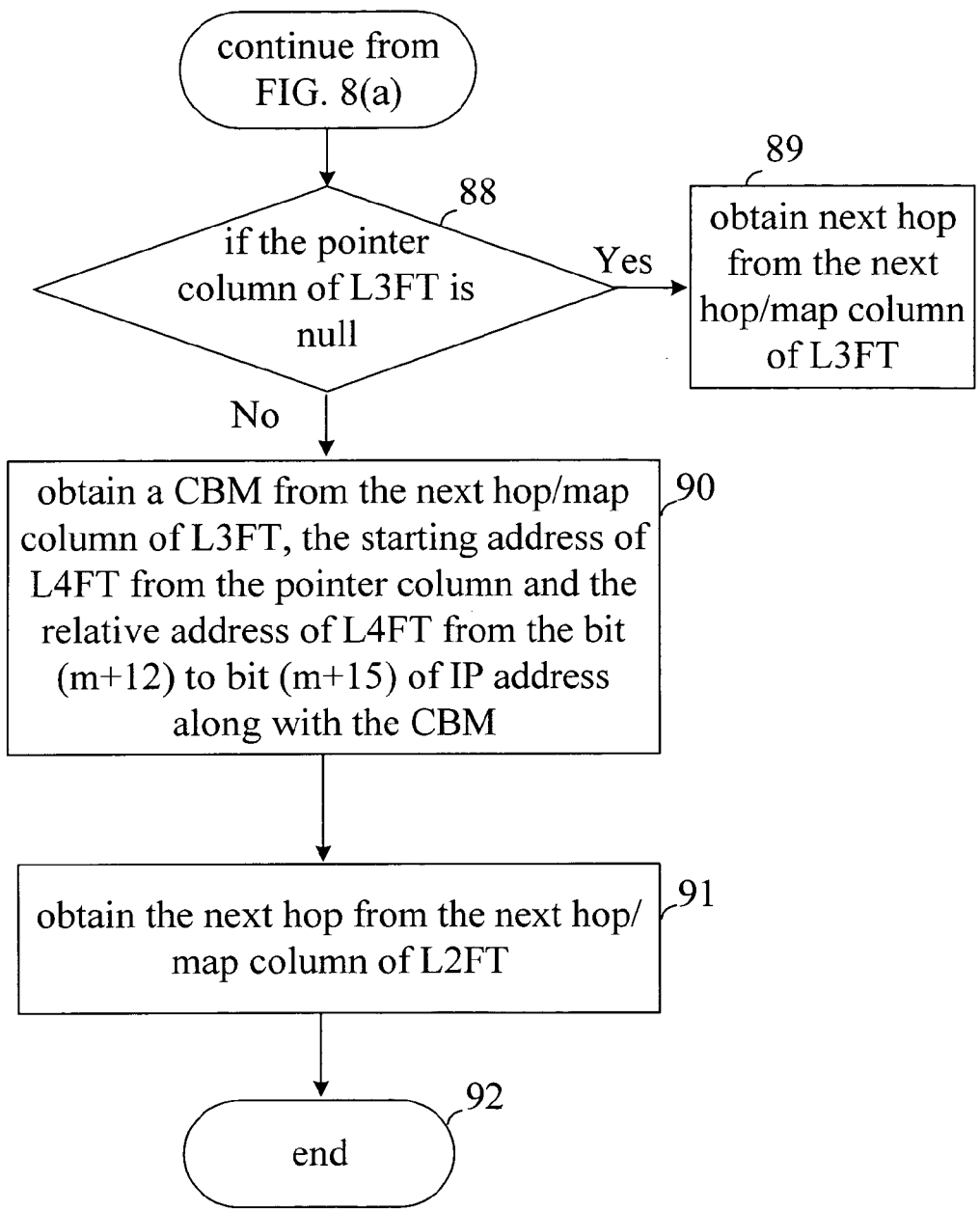

FIG. 8 shows a flow chart of the IP address lookup method according to the present invention. At step 80, the invention starts. At step 81, use the bit 0 to bit 11 counting from the left of IP address as the address accessing the first-level forwarding table. At step 82, determine if the pointer column of the first-level forwarding table is null. If the answer is positive, enter step 83, otherwise enter step 84. At step 83, obtain the next hop from the next hop/map column of the first-level forwarding table. At step 84, obtain a CBM from the next hop/map column of the first-level forwarding table, the starting address of the second-level forwarding table from the pointer column and the relative address of the second-level forwarding table from the bit 12 to bit 15 of IP address along with the CBM. At step 85, check if the longest offset column of the second-level forwarding table is 0. If the answer is positive, enter step 86, otherwise, enter step 87. At step 86, obtain the next hop from the next hop/map column of the second-level forwarding table. At step 87, use the longest offset m of the longest offset column in the second-level forwarding table to obtain the relative address of the third-level forwarding table from the bit 16 to bit (m+11) of IP address. At step 88, check if the pointer column of the third-level forwarding table is null. If the answer is positive, enter step 89, otherwise, enter step 90. At step 89, obtain next hop from the next hop/map column of the third-level forwarding table. At step 90, obtain a CBM from the next hop/map column of the third-level forwarding table, the starting address of the fourth-level forwarding table from the pointer column and the relative address of the fourth-level forwarding table from the bit (m+12) to bit (m+15) of IP address along with the CBM. At step 91, obtain the next hop from the next hop/map column of the fourth-level forwarding table. At step 92, the invention is done.

Figure 9:
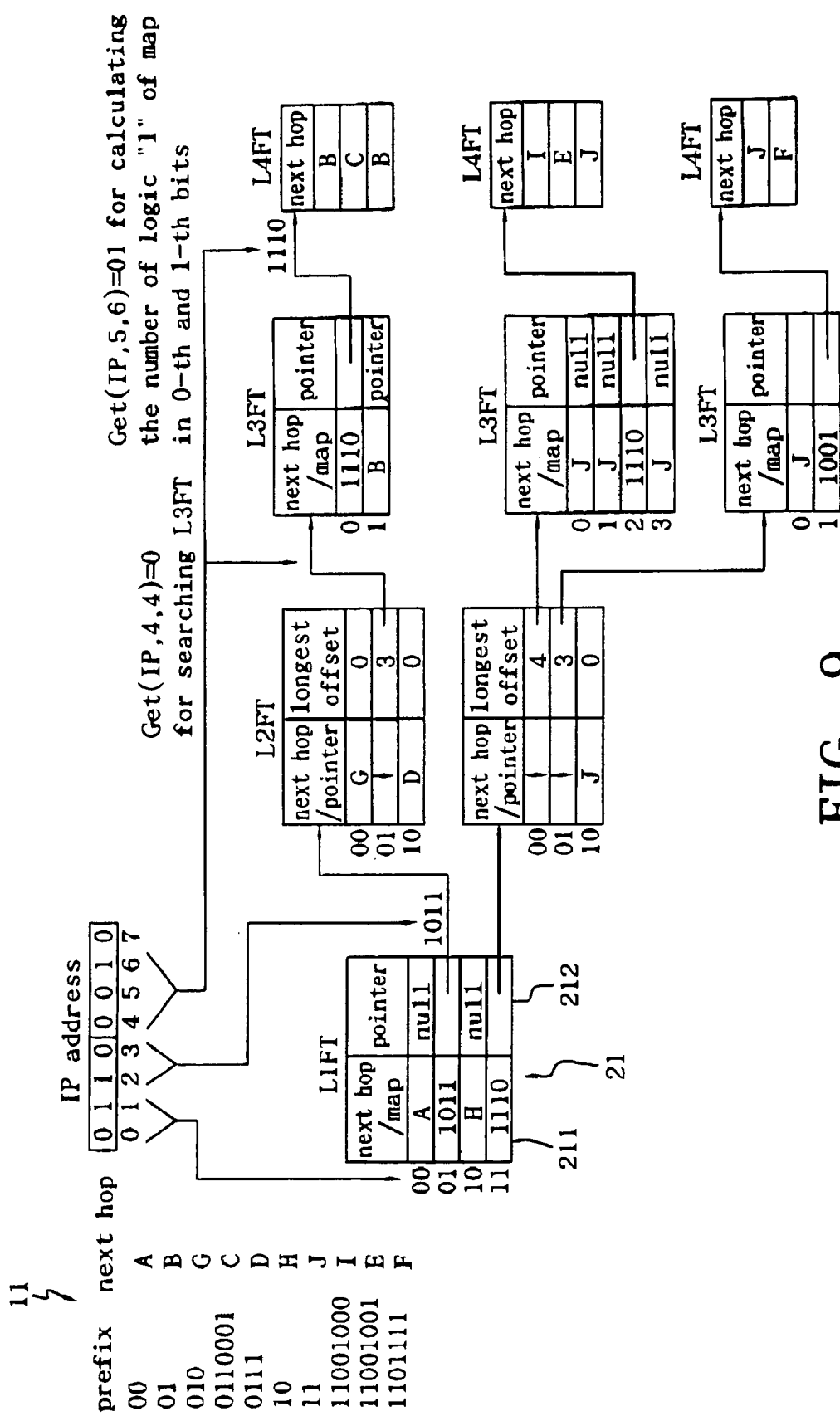
FIG. 9 shows an other embodiment of the IP address lookup method according to the present invention.

FIG. 9 shows another embodiment of the IP address lookup method according to the present invention, in which the first two bits of IP address (bit 0 and 1) are taken as the address to access the first-level forwarding table 21. If the embedded pointer column 212 of the corresponding first-level forwarding table 21 is null, the value of the next hop/map column 211 represents the next hop. Otherwise, the value of the next hop/map column 211 (1011) represents a CBM. The second and the third bits of IP address are used to calculate the bit with logic 1 of the CBM at where the IP address is located, in this example, it is the second entry located at the second-level forwarding table 22. As the longest offset value of the second-level forwarding table 22 is 3, the fourth bit of IP address is taken as the address for accessing the third-level forwarding table 23. If the embedded pointer column 232 of the corresponding third-level forwarding table 23 is null, the value of the next hop/map column 231 represents the next hop. Otherwise, the value of the next hop/map column 231 (1110) represents a CBM. The fifth and the sixth bits of IP address are used to calculate the bit with logic 1 of the CBM at where the IP address is located, in this example, it is the second entry located at the fourth-level forwarding table 24. The following calculation method can be used for IP lookup table calculation.

The Algorithm of IP Lookup Table Calculation

---

Input: first-level and fourth-level forwarding tables (L1FT±L4FT)
Output: next hop
/* L1FT[k$_1$].I represents next hop/mapping of the k$_1$-th content of L1FT,
   L1FT[k$_1$].P represents a pointer of the k$_1$-th content of L1FT,
   L2FT$_{k1}$[k$_2$].I represents next hop/mapping of the k$_2$-th content of L2FT,
   L2FT$_{k1}$[k$_2$].L represents a longest offset of the k$_2$-th content of L2FT,
   L3FT$_{k2}$[k$_3$].I represents next hop/mapping of the k$_3$-th content of L3FT,
   L3FT$_{k2}$[k$_3$].P represents a pointer of the k$_3$-th content of L1FT,
   L4FT$_{k3}$[k$_4$] represents a next hop of the k$_4$-th content of L4FT,
   Get(IP,a,b) represents a function of returning the a-th to b-th bits
(calculated from the leftmost bit) of the IP address */
   j$_1$=Get(IP,0,11)
       If L1FT[k$_1$].P=null then return L1FT[k$_1$].I
       Else
           {j$_2$=Get(IP, 12, 15)
           j$_3$= bit number of L1FT[j$_1$].I from the 0-th to j$_2$-th bits
               exhibiting
                   logic "1"
           j$_3$= j$_3$−1
           If L2FT$_{j1}$[j$_3$].L=null then return L2FT$_{j1}$[j$_3$].I
           If L2FT$_{j1}$[j$_3$].L≤4then return
               L3FT$_{j3}$[Get(IP,16,L2FT$_{j1}$[j$_3$].L+15)].I
           Else
               {j$_4$=Get(IP,16,L2FT$_{j1}$[j$_3$].L+11)
                   If L3FT$_{j3}$[j$_4$]. P=null then return L3FT$_{j3}$[j$_4$].I
                   Else
                       {j$_5$=Get(IP,16,L2FT$_{j1}$[j$_3$].L+
                           12,L2FT$_{j1}$[j$_3$].L+15)
               j$_6$= bit number of L2FT$_{j3}$[j$_4$].I from the 0-th to
               j$_5$-th bits
                   exhibiting logic "1"
               j$_6$= j$_6$ − 1
               return L4FT$_{j4}$[j$_6$]
               }
           }
   }

---

Figure 10:
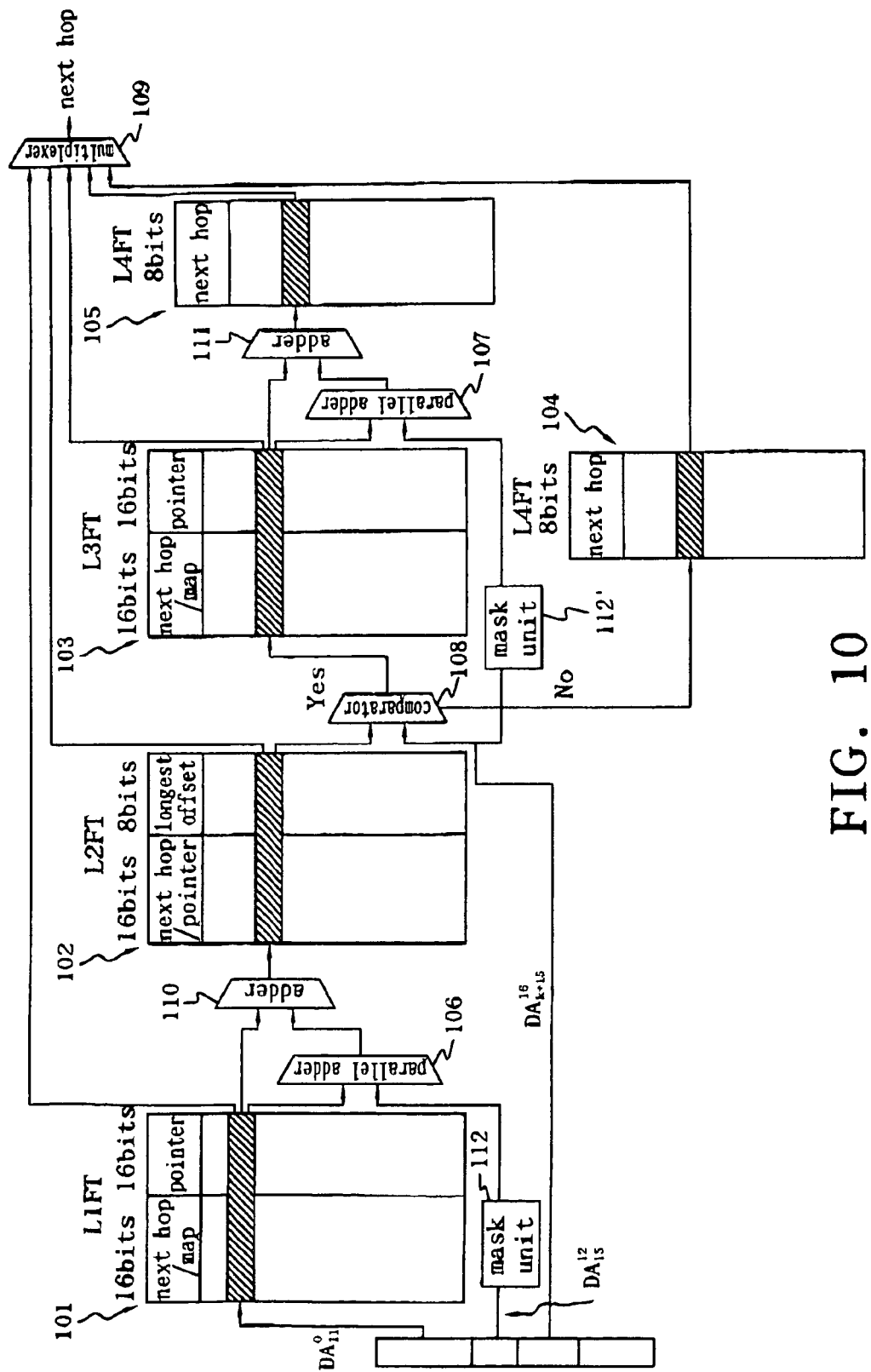
FIG. 10 shows one embodiment of the IP address lookup apparatus according to the present invention.

FIG. 10 shows one embodiment of the IP address lookup apparatus according to the present invention, comprising a first-level forwarding table 101 (including the 16-bit next hop/map column and 16-bit pointer column), a second-level forwarding table 102 (including 16-bit next hop/map column and 8-bit longest offset column), a third-level forwarding table 103 (including 16-bit next hop/map column and 16-bit pointer column), a third-level forwarding table 104 (including 8-bit next hop column) a fourth-level forwarding table 105 (including 8-bit next hop column), two parallel adders 106 and 107, a comparator 108, two adders 10 and 111, a multiplexer 109 and two mask units 112 and 112'. IP address is from bit 0 to bit 31, in which symbol $DA_b^a$ represent the bit a to bit b of IP address and $$DA_{11}^0$$

is the address for accessing the first-level forwarding table. If the accessing pointer column is null, output the value of the next hop/map column to the multiplexer 109. The mask unit 112 is used to convert $$DA_{15}^{12}$$

to 16-bit mask. The 16-bit mask is 1100000000000000 if the value of $$DA_{15}^{12}$$

is 0001 and 1110000000000000 if the value of $$DA_{15}^{12}$$

is 0010 and so forth. The parallel adder 106 is used to calculate the value of next hop/map column and the count of logic 1 of the value after being processed by mask unit 112, and the output is taken as the relative address for accessing the second-level forwarding table 102. The adder 110 is used to add the pointer (represents the starting address for accessing the second-level forwarding table 102) and the output of the parallel adder 106 (represents the relative address for accessing the second-level forwarding table 102). If the longest offset column for accessing the second-level forwarding table is 0, output the value of the next hop/map column to the multiplexer 109. The comparator 108 is used to compare if the longest offset value is larger than 4. If the answer is positive, look for the third-level forwarding table 103, otherwise, look for another third-level forwarding table 104. The parallel adder 107 is used to calculate the value of the next hop/map column and the count of logic 1 of the value after being processed by the mask unit 112, and output the relative address for accessing the fourth-level forwarding table 105. The adder 111 is used to add the pointer (represents the starting address for accessing the fourth-level forwarding table 105) and the output of the parallel adder 107 (represents the relative address for accessing the fourth-level forwarding table), and generate the address for accessing the fourth-level forwarding table 105. The mask unit 112' functions the same as the mask unit 112 and is used to convert $$DA_{15}^{12}$$

to 16-bit mask. The value of the next hop/map column of the fourth-level forwarding table 105 is outputted to the multiplexer 109.

Table 1 is the comparison analysis table concerning the execution performance and hardware requirements of the invention, conventional indirect lookup table method and Patent Publication No. 410292 of Republic of China. Through the analysis of table 1, the invention can be verified to have better performance than the conventional techniques regardless of the execution performance and hardware cost.

TABLE 1

|  | The number of memory accesses (at least/at most) | Size of the forwarding tables | Implemented by SRAM |
| --- | --- | --- | --- |
| The present invention | 1/4 | 250K~260 KB | Yes |
| Indirect lookup table method | 1/3 | 450K~470 KB | Yes |
| ROC patent publication No. 410292 | 1/2 | 33 MB | No |

The above-described embodiments of the present invention are intended to be illustrative only. Numerous alternative embodiments may be devised by those skilled in the art without departing from the scope of the following claims.

What is claimed is:

1. An IP address construction method used in routers, which records prefixes and next hops corresponding to a routing table by using first-level to fourth-level forwarding tables, comprising the following steps:

generating a segment array and a plurality of next hop arrays;

dividing said segment array into a plurality of first groups;

recording a next hop in a next hop/map column of said first-level forwarding table and recording a null in a pointer column of said first-level forwarding table if all bits of said first group are identical; otherwise, recording a compression bit map in said next hop/map column of said first-level forwarding table and recording an address of said second-level forwarding table in said pointer column of said first-level forwarding table;

sequentially and unrepeatedly recording next hops of said segment array in said next hop/pointer column of said second-level forwarding table and recording a null in a longest offset column of said second-level forwarding table if a bit number of said prefix is less than 16; otherwise, recording a pointer in said next hop/pointer column of said second-level forwarding table and recording a longest offset in said longest offset column of said second-level forwarding table;

recording next hops in said third-level forwarding table if a longest offset of said first group is greater than 4; otherwise, dividing said next hop array into a plurality of second groups;

recording a next hop in said next hop/map column of said third-level forwarding table and recording a null in a pointer column of said third-level forwarding table if all bits of said IP address in said second group are identical; otherwise, recording a compression bit map in said next hop/map column of said third-level forwarding table and recording an address of said fourth-level forwarding table in a pointer column of said third-level forwarding table; and recording a next hop by using said fourth-level forwarding table.

2. The IP address construction method of claim 1, wherein said segment array is scanned by a unit of $2^4$ entries and divided into $2^{12}$ first groups.

3. The IP address construction method of claim 1, wherein said next hop array is scanned by a unit $2^4$ entries and divided into $2^{longest\ offset-4}$ second groups.

4. An IP address lookup method for searching an IP address in the IP address construction of claim 1, comprising the following steps:

accessing said first-level forwarding table by using x bits of said IP address;

generating a next hop from said next hop/map column of said first-level forwarding table if said pointer column of said first-level forwarding table is null; otherwise obtaining a compression bit map from said next hop/map column of said first-level forwarding table and obtaining a starting address of said second-level forwarding table from said pointer column of said first-level forwarding table;

generating a relative address of said second-level forwarding table from residual 16-x bits of said IP address and said compression bit map;

obtaining a next hop from said next hop/map column of said second-level forwarding table if said longest offset column of said second-level forwarding table is 0; otherwise, using a longest offset m in said longest offset column in said second-level forwarding table to obtain a relative address of said third-level forwarding table from bit 16 to bit (m+11) of said IP address;

obtaining a next hop from said next hop/map column of said third-level forwarding table if said pointer column of said third-level forwarding table is null; otherwise, obtaining a compression bit map from said next hop/map column of said third-level forwarding table and obtaining a starting address of said fourth-level forwarding table from said pointer column of said third-level forwarding table;

obtaining a relative address of said fourth-level forwarding table from bit (m+12) to bit (m+15) of said IP address and said compression bit map; and obtaining a next hop from said next hop/map column of said fourth-level forwarding table.

5. The IP address lookup method of claim 4, wherein an access address of said first-level forwarding table is selected from bit 0 to bit 11 of said IP address.

6. An IP address lookup apparatus for searching an IP address in the IP address construction of claim 1, comprising:

a first-level forwarding table including a next hop/map column and a pointer column, and an access address of said first-level forwarding table being from x bits of said IP address;

a first mask unit for masking residual 16-x bits of said IP address;

a first parallel adder connected to said next hop/map column of said first-level forwarding table and said first mask unit for generating a relative address of accessing said second-level forwarding table;

a first adder for summing said pointer of said first-level forwarding table and an output of said first parallel adder;

a second-level forwarding table including a next hop/map column and a longest offset column, and an access address of said second-level forwarding table being from an output of said first adder;

a third-level forwarding table including a next hop/map column and a pointer column, and an access address of said third-level forwarding table being from a longest offset of said longest offset column of said second-level forwarding table;

a second mask unit for masking residual 16-x bits of said IP address;

a second parallel adder connected to said next hop/map column of said third-level forwarding table and said second mask unit for generating a relative address of accessing said fourth-level forwarding table;

a second adder for summing said pointer of said third-level forwarding table and an output of said second parallel adder;

a fourth-level forwarding table including a next hop column, and an access address of said fourth-level forwarding table being from an output of said second adder; and a multiplexer connected to said next hop/map column of said first-level forwarding table, said next hop/pointer column of said second-level forwarding table, said next hop/map column of said third-level forwarding table and said next hop column of said fourth-level forwarding table.

7. The IP address lookup apparatus of claim 6, further comprising a comparator and another third-level forwarding table including only a next hop column, wherein said IP address is searched in said next hop/map column and pointer column of said third-level forwarding table if said longest offset of said second-level forwarding table is larger 4; otherwise, only said third-level forwarding table including only a next hop column is searched.

8. The IP address lookup apparatus of claim 6, wherein an access address of said first-level forwarding table is selected from bit 0 to bit 11 of said IP address.

* * * * *